Dec. 10, 1935.  H. W. FAWCETT  2,023,762
CENTRIFUGAL SEPARATOR
Filed Nov. 11, 1931  2 Sheets-Sheet 1

INVENTOR
Harold William Fawcett.
By Spear Drinkerau & Hall

Dec. 10, 1935.    H. W. FAWCETT    2,023,762
CENTRIFUGAL SEPARATOR
Filed Nov. 11, 1931    2 Sheets-Sheet 2

INVENTOR
Harold William Fawcett
by Spear, Donaldson & Hall

Patented Dec. 10, 1935

2,023,762

UNITED STATES PATENT OFFICE 2,023,762

CENTRIFUGAL SEPARATOR

Harold William Fawcett, Harrogate, England

Application November 11, 1931, Serial No. 574,426
In Great Britain November 11, 1930

16 Claims. (Cl. 233—20)

This invention relates to centrifugal separators of the kind having peripheral sludge discharge apertures and means co-acting with said sludge discharge apertures, to permit of the intermittent discharge of sludge therefrom.

In the specification of my co-pending application Serial No. 541,478 filed the 1st June, 1931, now matured into a Patent No. 1,921,181, I have described a centrifugal separator of the foregoing kind, in which means are provided which are adapted to be set into operation when the sludge accumulating in the vicinity of the sludge discharge apertures exceeds a given level, to permit of the discharge of sludge from said discharge apertures.

The present invention provides a modification of a centrifugal separator as described in the specification of the aforesaid co-pending application, in which the means for permitting the discharge of sludge from the sludge discharge apertures can operate either dependently or independently of the accumulation of sludge or liquid in the separator and in which the means cooperating with said sludge discharge apertures for arresting the further discharge of sludge therefrom are operated when the discharged sludge has attained a predetermined weight, volume or fluidity. Further objects and advantages of the invention will appear as the description thereof proceeds.

In order more clearly to understand the invention, reference is made to the accompanying drawings which illustrate by way of example, various embodiments of centrifugal separators constructed in accordance therewith, and in which:—

In the different figures of the drawings, like parts are denoted by like reference characters.

Figures 1, 3:
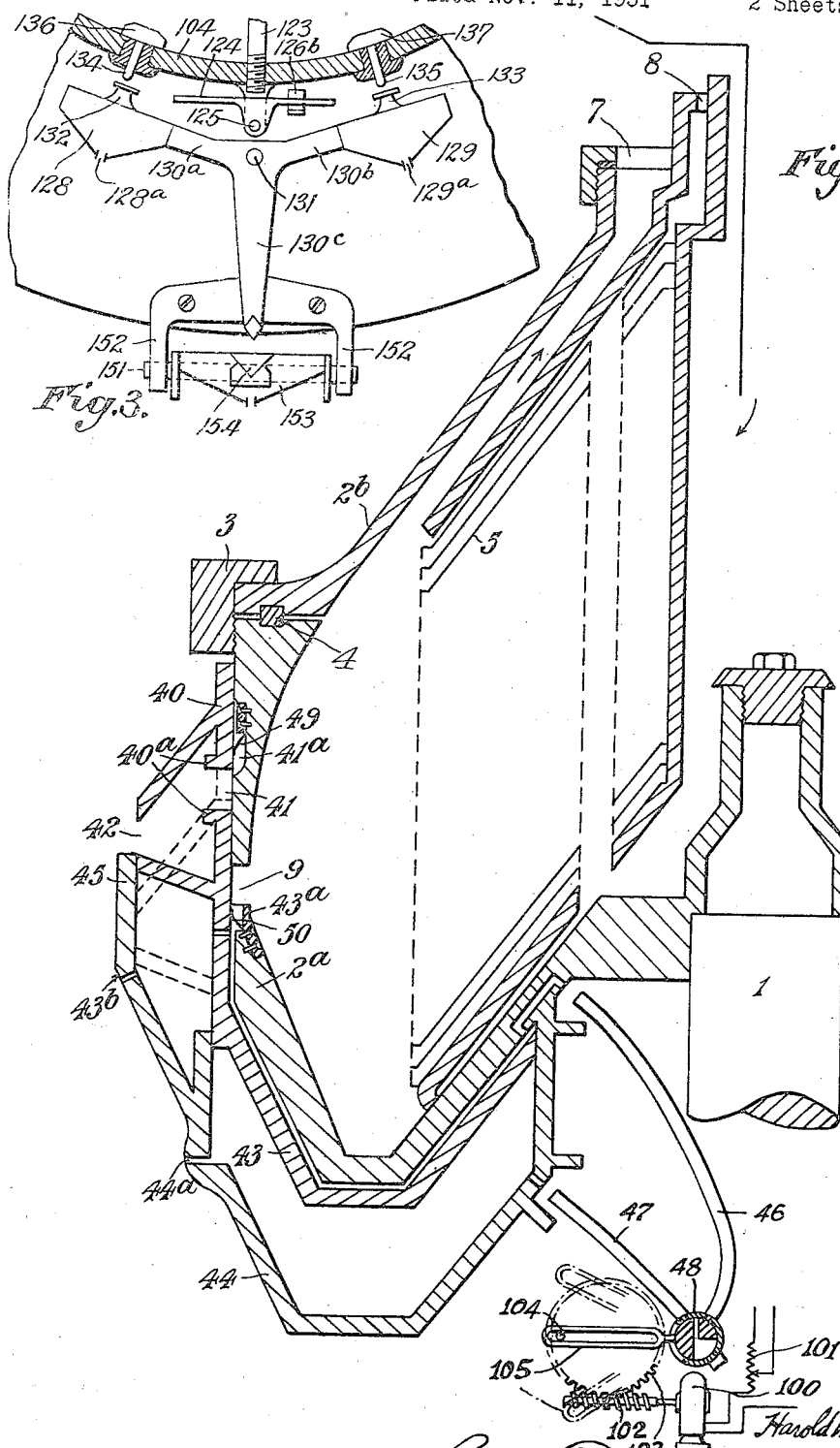
Fig. 1 is a half section of one embodiment.
Fig. 3 shows a detail of Fig. 2.

In the embodiment shown in Fig. 1, 1 indicates the rotary spindle of a centrifugal separator on which is mounted the rotary casing 2a, 2b. The parts 2a and 2b are secured together by means of a lock ring 3 with the interposition of a rubber or like packing ring 4. 5 denotes conical separating plates which rotate together with the casing. Liquid to be purified is introduced into the casing through a feed pipe 6 and the purified liquid constituents escape, according to their density through outlets 7 and 8. The sludge collects in the vicinity of a number of peripheral discharge apertures 9, only one of which is shown.

The sludge is intermittently removed from the discharge aperture 9 to the outside of the machine in portions of predetermined volume by a hollow ring 40 sliding up and down across the aperture 9. Said ring 40 is provided with apertures 41 at the side adjacent to the inner casing 2a of the separator and apertures 42 staggered in relation to the apertures 41 at the side remote from the inner casing 2a.

The ring 40 is mounted on a piston member 43 adapted to move up and down in a cylinder formed between the inner casing 2 and an outer casing 44. Integral with the outer casing 44 and projecting therefrom is a ring 45 adapted to close the aperture 42 in a sludge-tight manner on the downward movement of the hollow ring 40.

The ring 40 is provided in the vicinity of the aperture 41 with outwardly extending projections 40a adapted to form a trap for air imprisoned in the ring on sludge entering therein, in order to prevent said air from reaching the interior of the separator and setting up disturbances.

46 and 47 indicate pipes respectively supplying liquid to the space between the inner casing 2 and piston member 43 and to the space between the piston member 43 and the outer casing 44. The supply of liquid to the aforesaid spaces is controlled by a valve 48 in such a way that when liquid is supplied to one of said spaces the supply of liquid to the other is shut off. Said valve 48 is actuated by a variable speed electromotor 100 the speed of which is varied by means of a rheostat 101, through a worm 102 and worm wheel 103 which latter carries a pin 104 engaging in a slotted arm 105 fast with the valve 48 and converts the rotary movement of the worm wheel 103 into a reciprocating movement of the valve 48. The piston 43 is provided with drain holes 43a, 43b and the outer casing 44 is similarly provided with a drain hole 44a.

Spring rings or scrapers 49, 50 are fitted to bear by centrifugal force against the ring 40 and thereby to maintain a liquid and sludge-tight fit between the ring 40 and casing 2a. Moreover grooves may be cut into the ring 40 to receive and retain sludge and thus to maintain a seal of sludge between the ring and the casing 2a.

The machine operates as follows:—

On liquid being admitted by valve 48 through pipe 46 to the space between the inner casing 2 and the piston 43 the piston moves downwardly under the centrifugal pressure of the liquid and any liquid between the piston 43 and outer casing 44 escapes through the drain hole 44a. In moving downwards, the piston 43 carries with it the hollow ring 40. The opening 42 of this ring is then closed by the ring 45 whilst during further downward movement of the ring 42 the opening 41 registers with the sludge aperture 9, whereupon the ring 40 becomes filled with sludge. The valve 48 is thereupon operated to supply liquid through pipe 47 to the space between the piston 43 and outer casing 44 and thus to shut off the supply of liquid to the pipe 46. The centrifugal pressure of the liquid supplied through pipe 47 will thereupon cause the piston 43 and with it the ring 40, to move upwards and the liquid in the space between the piston 43 and inner casing 2 will escape through the drain holes 43a, 43b. On the upward movement of the ring 40 it slides past the aperture 9 and closes same whilst on the continuance of this movement the aperture 42 is exposed and thus the sludge escapes from the ring 42. Liquid is thereupon again supplied through pipe 46 and the cycle of operations commences afresh.

The valve 48 may be operated by any suitable means or even manually.

If desired cup leathers or other tightening means such as scrapers in the form of a piston ring may be interposed between the ring 40 and the coacting surfaces 2 and 45. Moreover the ring 40 may be divided into a number of separate compartments corresponding to the number of sludge discharge apertures 9.

Figure 2:
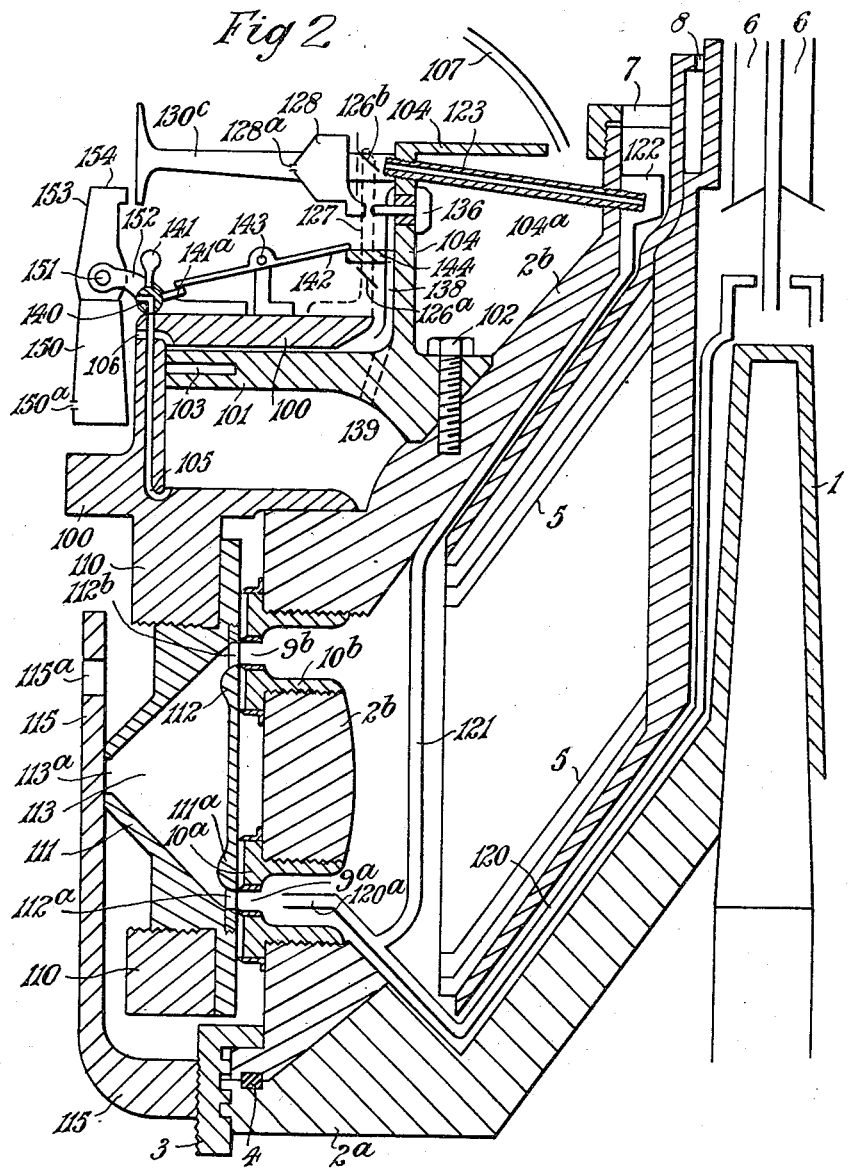
Fig. 2 is a half section of a second embodiment.

In the embodiment shown in Figs. 2 and 3, the sludge escapes through two sets of superimposed peripheral discharge apertures 9a, 9b formed in nozzles 10a, 10b screwed into the part 2b of the casing.

At the top of and surrounding the part 2b is an annular cylinder 100 adapted to move relatively to a stationary piston 101 secured to the part 2b by bolts 102. A packing washer 103 is provided on the piston 101 to ensure a liquid tight fit. The piston 101 carries an upstanding annular part 104 adapted to form an annular reservoir 104a for liquid actuating the cylinder. The cylinder 100 has two outlet passages 105 and 106 adapted to permit of escape of the actuating liquid from the lower and upper parts of the cylinder 100 respectively. Actuating liquid is supplied to the reservoir 104a by a pipe 107.

Secured to the underside of the cylinder 100 is a ring 110 into which is screwed a series of conical members 111 into each of which is screwed a disc 112 to form a compartment 113 for sludge discharged from the apertures 9a and 9b. The disc 112 is provided with apertures 112a and 112b coacting with the discharge apertures 9a, 9b respectively; screwed on to the lock ring 3 is a ring 115 normally closing an outlet opening 113a of the compartment 113 but having an aperture 115a registering with the opening 113a when the cylinder 100 reaches the top of its stroke.

120 indicates a pipe through which an additional liquid such as water is supplied. Said pipe terminates at 120a in the vicinity of the discharge nozzle 9a and communicates with a branch pipe 121 leading to a closed chamber 122. Screwed into the chamber 122 is an adjustable centrifugal overflow pipe 123 leading said additional liquid into valve actuating mechanism hereinafter more fully described with reference to Fig. 3.

Arranged in front of the overflow pipe 123 is a deflecting plate 124 pivotally mounted on a pin 125 attached to stationary casing 104 adapted to be moved in one or other direction by a pair of cams 126a, 126b carried by the cylinder 100 on a bracket 127. Movement of the deflecting plate in one direction by one or other of the cams 126a, 126b, deflects the liquid issuing from the overflow pipe 123 into one of two leaking cups 128, 129 having drain holes 128a and 129a respectively which are mounted on a three armed lever 130a, 130b and 130c pivoted at 131 and causes said lever 130a, 130b, 130c to tilt in one or other direction.

The cups 128 and 129 are provided with members 132 and 133 respectively which are adapted to engage valve stems 134, 135 of valves 136, 137 respectively in the casing 104 of the reservoir 104a. The opening of the valve 136 causes liquid from reservoir 104a to be supplied through a conduit 138 to the part of the cylinder 100 above the stationary piston 101 whilst the opening of the valve 137 causes liquid from said reservoir to be supplied through a conduit 139 (not shown) to that portion of the cylinder 100 below the piston 101.

Interposed in the conduit 105 is a valve 140 controlled by a weighted bell crank lever 141, 141a, the arm 141a of which is engaged by a catch lever 142 pivoted at 143 one arm of which is engaged by a projection 144 on the stationary part 104. On opening, the valve 140 permits liquid to issue from below the piston into a cup 150 having a leak hole 150a and pivotally suspended at 151 from brackets 152 secured to the top of the cylinder 100. An arm 153 fast with the cup 150 has a V-shaped recess 154 adapted on the outward movement of the cup 150 and corresponding inward movement of the arm 153 to engage and centralize the lever arm 130c.

A similar valve with bell crank lever with actuating means similar to catch 142 and projection 144 on the stationary part of the casing is provided in the outlet conduit 106, but not shown.

The apparatus operates as follows:

When the sludge accumulating in the nozzles 9a exceeds a given depth it engages and chokes the opening 120a in pipe 120 causing liquid to be diverted through pipe 121 into chamber 122 and from thence through overflow 123 on to deflecting plate 124 which is moved by cam 126b into a position to deflect liquid into cup 129. Inasmuch as the cup 150 is empty the arm 130c is not held and centralized and the cup 129 accordingly moves outwards whilst the cup 128 moves inwards and strikes with member 132 against valve stem 134, thereby opening the valve 136 and permitting liquid from reservoir 104a to enter into the cylinder 100 above piston 101 through conduit 138. The cylinder 100 and the parts carried thereby thereupon move upwardly during which upward movement the pipe 106 is closed by the valve (not shown) similar to the valve 140. When the cylinder arrives at the top of its stroke the valve in the pipe 106 is opened by the catch mechanism (not shown but hereinbefore referred to) with the result that liquid is discharged from the part of the cylinder 100 above piston 101 is discharged into the cup 150. This cup thereupon moves outwardly and the arm 153 with it; V-shaped depression 154 engages and centralizes the arm 130c with the result that the cups 128 and 129 are brought into the position shown in Fig. 3 and valve 136 closed.

During its upward movement, the cylinder 100 carries with it the ring 110 and compartment 113 shutting off the discharge apertures 9a and 9b and subsequently the aperture 113a registers with the aperture 115a of the ring 115 whereby the sludge contained in the compartment 113 is discharged.

A certain time lag permitting of complete discharge from the compartment 113 is permitted by the engagement of arm 130c in the recess 154 on arm 153, which is determined by the length of time required by the liquid to discharge from the cylinder 100 and by the cup 150 in emptying.

Meanwhile the deflecting plate 124 has been engaged by cam 126a and liquid from pipe 123 thus enters the cup 128. As soon as the cup 150 has emptied it moves inwardly under the action of centrifugal force and releases arm 130c and thus allows the filling cup 128 to move outwardly whereby the stop 133 on cup 129 opens valve 137 causing liquid from reservoir 104a to enter the cylinder 100 beneath the piston 101, thereby causing a reverse movement of the cylinder which continues until the cylinder returns to the bottom of its stroke when the discharge apertures 9a and 9b are again uncovered and sludge accumulating therein is discharged into the compartment 113, thereby freeing the opening 120a of pipe 120.

At the bottom of the stroke of the cylinder the projection 144 tilts the arm 142 which thus engages the arm 141a and tilts the bell crank lever so as to open the valve 140 against the centrifugal closing force of the weighted arm 141 and the cycle of operations is repeated as soon as the opening 120a of pipe 120 is again choked by sludge.

It should be well understood that the foregoing embodiments are given purely by way of example and that the invention is capable of numerous alterations and modifications without departing from the spirit and scope thereof as defined in the appended claims.

I claim:—

1. A centrifugal separator, comprising a casing, at least one peripheral sludge discharge aperture in said casing, a member surrounding said casing and movable by hydraulic pressure in relation thereto, at least one aperture in said surrounding member out of line with the discharge apertures of the casing, means for intermittently applying hydraulic pressure between said casing and said surrounding member and at least one annular receiving compartment between said casing and said surrounding member which is adapted to collect a predetermined volume of sludge discharged from said sludge discharge apertures in said casing and which is emptied on movement of said surrounding member relative to said casing.

2. A centrifugal separator, comprising a casing, at least one peripheral sludge discharge aperture in said casing, a member surrounding said casing and movable my hydraulic pressure in relation thereto, at least one aperture in said surrounding member out of line with the discharge apertures of the casing, means for intermittently applying hydraulic pressure between said casing and said surrounding member and at least one receiving compartment between said casing and said surrounding member which is adapted to collect a predetermined volume of sludge discharged from said sludge discharge aperture in said casing and which is emptied on movement of said surroundng member relative to said casing.

3. A centrifugal separator comprising a rotating casing within which the centrifugal purification takes place, said casing having at least one small peripheral sludge discharge aperture, a sludge receiving chamber of substantially less capacity than that of said casing, located outside said casing and co-rotating therewith and having valve controlled outlet means for said sludge, hydraulically operated slide valve means controlling the passage of sludge from said casing to said sludge receiving chamber and at least one hydraulically operated slide valve controlling the outlet of sludge from said sludge receiving chamber in alternation with the inlet to said chamber of sludge from said casing whereby excessive loss of the contents of said casing at each discharge of sludge from said sludge discharge aperture is avoided and continuity of operation assured.

4. A centrifugal separator comprising a rotating casing within which the centrifugal purification takes place, said casing having at least one peripheral sludge discharge aperture, a sludge receiving chamber located outside said casing and co-rotating therewith but movable relatively thereto and having at least one inlet and one outlet opening for said sludge, an apertured member outside said sludge receiving member and cooperating with the sludge outlet openings therein, and means comprising a hydraulic piston for moving said sludge receiving chamber relatively to said casing and to said external apertured member to effect the outlet of sludge from said sludge receiving chamber in alternation with the inlet to said chamber of sludge from said casing.

5. A centrifugal separator comprising a rotating casing within which the centrifugal purification takes place, said casing having at least one peripheral sludge discharge aperture, a sludge receiving chamber located outside said casing and co-rotating therewith but movable relatively thereto and having at least one inlet and one outlet opening for said sludge, an apertured member outside said sludge receiving member and cooperating with the sludge outlet openings therein, and means comprising a hydraulic piston for moving said sludge receiving chamber relatively to said casing and to said external apertured member to effect the outlet of sludge from said sludge receiving chamber in alternation with the inlet to said chamber of sludge from said casing, and means for supplying actuating liquid to any desired side of said piston.

6. A centrifugal separator comprising a casing within which the centrifugal purification takes place, said casing having at least one peripheral sludge discharge aperture, a sludge receiving chamber located outside said casing and co-rotating therewith but movable relatively thereto and having at least one inlet and one outlet opening for said sludge, an apertured member outside said sludge receiving member and cooperating with the sludge outlet openings therein, means comprising a hydraulic piston for moving said sludge receiving chamber relatively to said casing and to said external apertured member to effect the outlet of sludge from said sludge receiving chamber in alternation with the inlet to said chamber of sludge from said casing, and means for supplying actuating liquid alternately to opposite sides of said piston.

7. A centrifugal separator comprising a rotating casing within which the centrifugal purification takes place, said casing having at least one peripheral sludge discharge aperture, a sludge receiving chamber located outside said casing and co-rotating therewith but movable relatively thereto and having at least one inlet and one outlet opening for said sludge, an apertured member outside said sludge receiving member and cooperating with the sludge outlet openings therein, means comprising a hydraulic piston for moving said sludge receiving chamber relatively to said casing and to said external apertured member to effect the outlet of sludge from said sludge receiving chamber in alternation with the inlet to said chamber of sludge from said casing, means for supplying actuating liquid to any desired side of the piston and means on either side of the piston permitting of the escape of actuating liquid.

8. A centrifugal separator comprising a rotating casing within which the centrifugal purification takes place, said casing having at least one peripheral sludge discharge aperture, a sludge receiving chamber located outside said casing and co-rotating therewith and having outlet means for said sludge, means controlling the passage of sludge from said casing to said sludge receiving chamber, means controlling the outlet of sludge from said sludge receiving chamber in alternation with the inlet to said chamber of sludge from said casing, a hydraulic piston operating said means controlling the flow of sludge into and out of said sludge receiving chamber and means for supplying actuating liquid to any desired side of said piston.

9. A centrifugal separator comprising a rotating casing within which the centrifugal purification takes place, said casing having at least one peripheral sludge discharge aperture, a sludge receiving chamber located outside said casing and co-rotating therewith and having outlet means for said sludge, means controlling the passage of sludge from said casing to said sludge receiving chamber, means controlling the outlet of sludge from said sludge receiving chamber in alternation with the inlet to said chamber of sludge from said casing, a hydraulic piston operating said means controlling the flow of sludge into and out of said sludge receiving chamber, and means for supplying actuating liquid alternately to opposite sides of said piston.

10. A centrifugal separator comprising a rotating casing within which the centrifugal purification takes place, said casing having at least one peripheral sludge discharge aperture, a sludge receiving chamber located outside said casing and co-rotating therewith and having outlet means for said sludge, means controlling the passage of sludge from said casing to said sludge receiving chamber, means controlling the outlet of sludge from said sludge receiving chamber in alternation with the inlet to said chamber of sludge from said casing, a hydraulic piston operating said means controlling the flow of sludge into and out of said sludge receiving chamber, means for supplying actuating liquid to any desired side of the piston and means on either side of the piston permitting of the escape of actuating liquid.

11. A centrifugal separator comprising a rotating casing within which the centrifugal purification takes place, said casing having at least one peripheral sludge discharge aperture, a sludge receiving chamber located outside said casing and co-rotating therewith and having outlet means for said sludge, means controlling the passage of sludge from said casing to said sludge receiving chamber, means controlling the outlet of sludge from said sludge receiving chamber in alternation with the inlet to said chamber of sludge from said casing, a hydraulic piston remote from the discharging parts of the separator operating said means controlling the flow of sludge into and out of said sludge receiving chamber and means for supplying actuating liquid to any desired side of said piston.

12. A centrifugal separator comprising a rotating casing within which the centrifugal purification takes place, said casing having at least one peripheral sludge discharge aperture, a sludge receiving chamber located outside said casing and co-rotating therewith and having outlet means for said sludge, means controlling the passage of sludge from said casing to said sludge receiving chamber, means controlling the outlet of sludge from said sludge receiving chamber in alternation with the inlet to said chamber of sludge from said casing, a hydraulic piston remote from the discharging parts of the separator operating said means controlling the flow of sludge into and out of said sludge receiving chamber, and means for supplying actuating liquid alternately to opposite sides of said piston.

13. A centrifugal separator comprising a rotating casing within which the centrifugal purification takes place, said casing having at least one peripheral sludge discharge aperture, a sludge receiving chamber located outside said casing and co-rotating therewith and having outlet means for said sludge, means controlling the passage of sludge from said casing to said sludge receiving chamber, means controlling the outlet of sludge from said sludge receiving chamber in alternation with the inlet to said chamber of sludge from said casing, a hydraulic piston remote from the discharging parts of the separator operating said means controlling the flow of sludge into and out of said sludge receiving chamber, means for supplying actuating liquid to any desired side of the piston and means on either side of the piston permitting of the escape of actuating liquid.

14. A centrifugal separator comprising a rotating casing within which the centrifugal purification takes place, at least one peripheral sludge discharge aperture in said casing, a valve normally tending to close said peripheral sludge discharge aperture, a liquid receiver operatively connected with said valve in such a way as to open same on being filled with liquid, a receiver for a constituent issuing from the sludge discharge aperture and attached to and rotating with said casing, lever mechanism carrying said last mentioned receiver and permitting of its radial movement relatively to its associated sludge discharge aperture, selective means for guiding only a portion of discharged constituents of suitable fluidity into said last mentioned receiver and means whereby said last mentioned receiver on being filled empties said first mentioned receiver to allow said valve to close under the influence of centrifugal force.

15. A centrifugal separator comprising a rotating casing within which the centrifugal purification takes place, said casing having at least one small peripheral sludge discharge aperture, a sludge receiving chamber of substantially less capacity than that of said casing located around and rotating with said casing and having valve controlled outlet means for said sludge, at least one slide valve controlling the passage of sludge from said casing to said sludge receiving chamber, at least one slide valve controlling the outlet of sludge from said sludge receiving chamber and hydraulic means opening said slide valves alternately, whereby excessive loss of the contents of the casing at each discharge of sludge from said sludge discharge apertures is avoided and continuity of operation assured.

16. A centrifugal separator comprising a rotating casing within which the centrifugal purification takes place, said casing having at least one small peripheral sludge discharge aperture, a hollow ring surrounding and rotating with said casing and forming a sludge receiving chamber of substantially less capacity than that of said casing, valve controlled outlet means for said sludge, from the interior of said hollow ring, at least one slide valve controlling the passage of sludge from said casing to the interior of said hollow ring, at least one operated slide valve controlling the outlet of sludge from said hollow ring and hydraulic means opening said valves alternately whereby excessive loss of the contents of the casing at each discharge of sludge from said sludge discharge apertures is avoided and continuity of operation assured.

HAROLD WILLIAM FAWCETT.